United States Patent

Kime et al.

[11] Patent Number: 5,182,739
[45] Date of Patent: Jan. 26, 1993

[54] APPARATUS FOR MAINTAINING A DISK AND OPTICAL HEAD IN ORTHOGONAL RELATION

[75] Inventors: Kenjiro Kime; Naoyuki Egusa; Keiji Nakamura, all of Nagaokakyo, Japan

[73] Assignee: Mitsubishi Denki Kabushiki Kaisha, Japan

[21] Appl. No.: 547,502

[22] Filed: Jul. 2, 1990

[30] Foreign Application Priority Data

Jul. 5, 1989 [JP] Japan .................................. 1-173295

[51] Int. Cl.⁵ ................................................ G11B 7/08
[52] U.S. Cl. ............................. 369/44.15; 369/44.14; 369/44.32; 369/263
[58] Field of Search ................ 310/328, 329, 330, 331, 310/332; 369/263, 264, 265, 266, 44.11, 44.13, 44.14, 44.15, 44.16, 44.17, 44.18, 44.21, 44.26, 44.32, 44.33, 54, 270

[56] References Cited

U.S. PATENT DOCUMENTS

| | | | |
|---|---|---|---|
| 3,914,595 | 10/1975 | Tinet | 250/202 |
| 4,385,373 | 5/1983 | Howe | 369/44.15 |
| 4,525,825 | 6/1985 | Ito et al. | 369/44.41 |
| 4,634,853 | 1/1987 | Kanamaru | 369/44.32 |
| 4,775,967 | 10/1988 | Shimada et al. | 369/44.41 |
| 4,837,759 | 6/1989 | Miyazaki et al. | 369/44.11 |
| 4,858,216 | 8/1989 | Kamiya | 369/44.14 |
| 5,008,873 | 4/1991 | Tanaka et al. | 369/44.14 |

Primary Examiner—Aristotelis Psitos
Assistant Examiner—P. W. Huber
Attorney, Agent, or Firm—Wolf, Greenfield & Sacks

[57] ABSTRACT

An optical head which optically records and regenerates data by condensing light beams from a light source on the disk surface, wherein a plurality of piezoelectric elements are arranged to correct the tilt of a condensing lens or the tilt of optical system supporting means for making the optical axis of the condensing lens for condensing light beams on the disk surface or the light beams orthogonal to the disk surface.

An optical disk drive provided with an optical head, wherein a plurality of piezoelectric elements are arranged to correct the tilt of the disk for making the optical axis of a condensing lens which condenses light beams on the disk surface orthogonal to the disk surface.

11 Claims, 17 Drawing Sheets

APPARATUS FOR MAINTAINING A DISK AND OPTICAL HEAD IN ORTHOGONAL RELATION

BACKGROUND OF THE INVENTION

1. Field of the Invention

This invention relates to an optical head which detects the inclination of the optical axis of light beams to a disk surface irradiated for recording and regenerating information to/from the disk, and keeps the optical axis of the light beams orthogonal to the disk surface.

2. Description of Related Art

FIGS. 3 and 4 are the illustrations showing the structure of a conventional optical head having correcting means of the light beam.

FIGS. 1 and 2 are the illustrations showing the structure of an optical system of an optical head. Numeral 1 denotes a semiconductor laser, which is a light source. On the light path of light beams 2 irradiated from the semiconductor laser 1, a collimator lens 3 and a half prism 4 are arranged. On the reflected light path of the half prism 4, a reflecting mirror 5, a ¼λ plate 6, a half prism 7, a condensing lens 8, and a 2-split photo detector 9 for detecting track deviation are arranged. On the reflected light path of the reflecting mirror 5, an object lens 14 used for condensing light beams on the recording surface of the disk 15 is arranged. On the reflected light path of the half prism 7, a condensing lens 10, a wedge prism 11, a magnifying lens 12, and a 4-split photo detector 13 which detects focal point deviation or signals from information pits on the disk 15 are arranged.

FIG. 3 is a perspective view showing the structure of an object lens actuator 19 for driving the object lens 14. The object lens actuator 19 comprises a stainless steel shaft 20 coated with fluorine resin, an aluminum bearing, a holder 22, a balancer 23, a focusing coil 24, tracking coils 25a, 25b, rubber dampers 26a, 26b, tracking magnets 27a, 27b with two poles magnetized, focusing magnets 28a, 28b with two poles magnetized, yokes 29a, 29b, and an actuator base 30 which doubles as a yoke.

FIG. 4 is a schematic view showing the structure of an optical disk drive on which the optical head is loaded. The disk 15 is rotated by a disk motor 32. The aforementioned optical parts are held on an optical head base 31, on the upper surface of which a tilt sensor for detecting the tilt of the disk 15, which comprises an LED 43 and 2-split photo detectors 42a, 42b is arranged. The optical head base 31 is rotatably supported by a rotary shaft 102 of a holding member 101, on the bottom surface of which a gear 104 rotated by a tilt correcting motor 103 is engaged. The holding member 101 and the tilt correcting motor 103 are slided in the radial direction of the disk 15 by a moving base 105.

The operation of the conventional optical head with the aforementioned structure will be explained. Light beams 2 irradiated from the semiconductor laser 1 are made parallel by the collimator lens 3. The parallel light beams 2 are focused through the half prism 4, the reflection mirror 5, and the object lens 14 onto the surface of the disk 15. The light beams 2 reflected by the disk 15 retrograde, which are then divided into two directions by the half prism 7. Light beams 2 in one direction irradiated the 2-split photo detector 9, and those in another direction irradiate the 4-split photo detector 13 for focusing through the condensing lens 10, the wedge prism 11, and the magnifying lens 12.

On the basis of signals of track deviation or focal point deviation detected by the 2-split photo detector 9 or the 4-split photo detector 13, the control circuit applies the drive current to the focusing coil 24 and tracking coils 25a, 25b arranged in each magnetic circuit, thus sliding the position of the object lens 14 along the shaft 20 in the direction indicated by an arrow A in FIG. 3 in order to correct focal point deviation, and the track deviation is corrected by rotating the object lens 14 around the shaft 20 in the direction shown by an arrow B.

The optical head forms favorable light spots with little optical aberration on the disk 15 when the optical axis of the object lens 14 is perpendicular to the recording surface of the disk 15. Consequently, this optical head is provided with means for correcting the tilt of the light beams as explained below. The moving base 105 is slidable in the radial direction of the disk 15 (the direction C in FIG. 4), and the optical head base 31 on moving base 105 is rocked in the direction shown by an arrow E in FIG. 4 by the tilt correcting motor 103.

The tilt of the disk 15 is detected by differential outputs from the 2-split photo detector 42a, 42b according to the spot shape of the light from the LED 43 reflected from the disk 15. The tilt correcting motor 103 is driven according to the detected amount, thereby rotating the gear 104, and then rocking the optical head base 31 in the direction E.

There are problems that by using the above-mentioned tilt correcting means, it is difficult to make the movable part lightweight, and increase the mechanical resonance frequency, which are required for high-speed access of the optical head, and the optical head construction is complicated.

At present, where the reduction of the access time to tens of millimeters/second or less or improved rotating speed to 1,800 rpm or more is required, a few kilohertz or more mechanical resonance frequency should be maintained, but in the optical head of the conventional construction, it is difficult to realize the light weight and increasing mechanical resonance frequency at the same time.

SUMMARY OF THE INVENTION

This invention was worked out to overcome the aforementioned problems.

The main object of this invention is to provide an optical head which can increase the mechanical resonance frequency of the movable unit with a simple construction and is equipped with a lightweight correction mechanism.

The above and further objects and features of the invention will more fully be apparent from the following detailed description with accompanying drawings.

DESCRIPTION OF THE PREFERRED EMBODIMENTS

Figure 1:
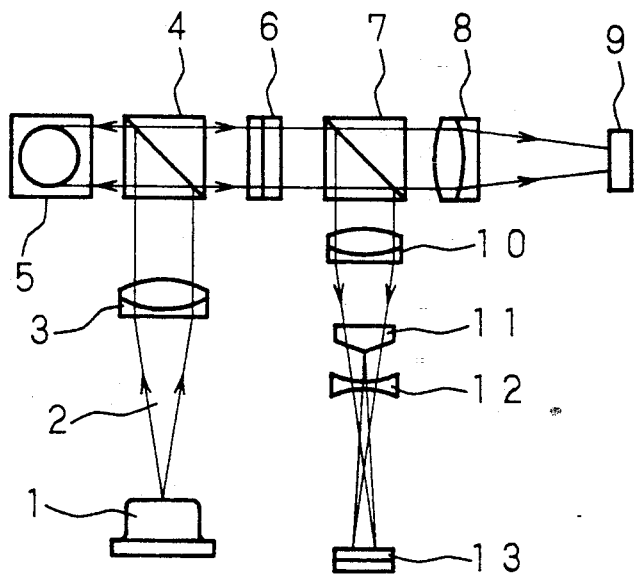
FIG. 1 and FIG. 2 are schematic views showing the structure of an optical system of an optical head.
Figure 2:
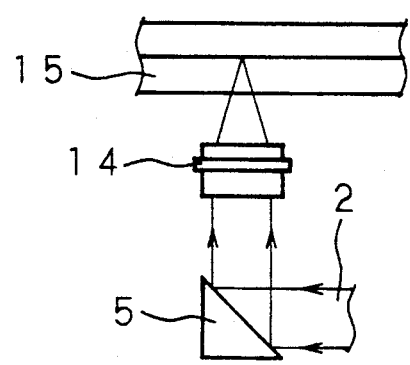
Figure 3:
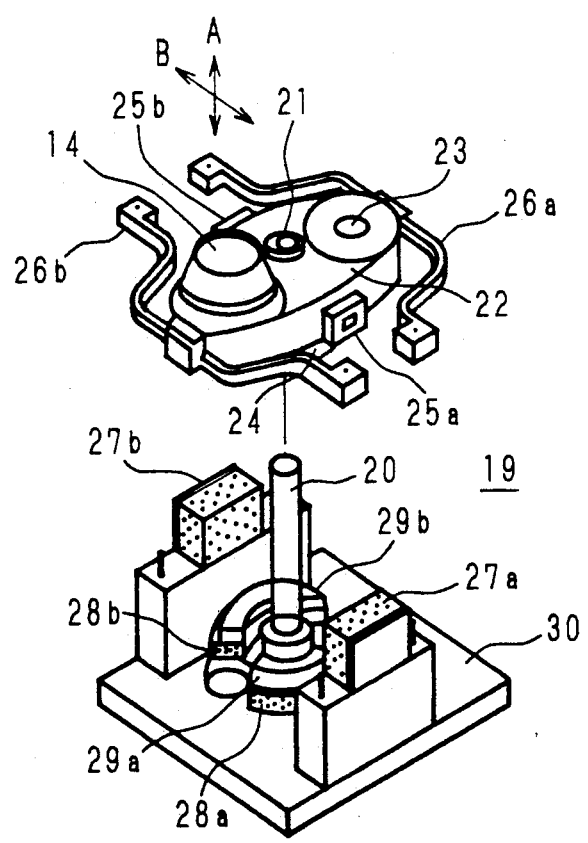
FIG. 3 is a schematic view showing the structure of an object lens actuator.
Figure 4:
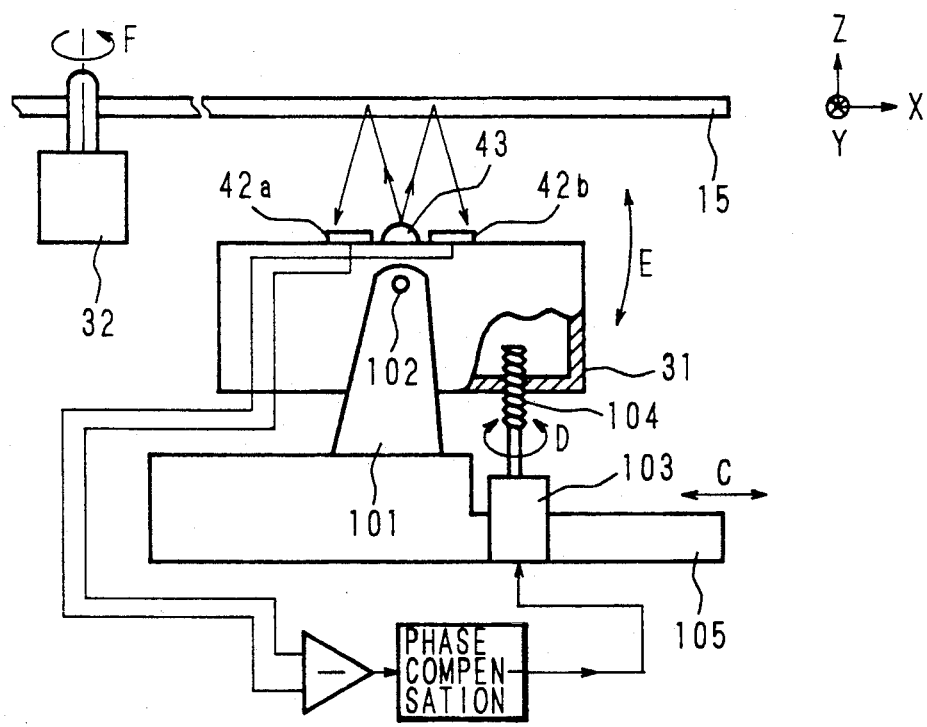
FIG. 4 is a schematic view showing the structure of an optical disk drive loaded with the conventional optical head.
Figure 5:
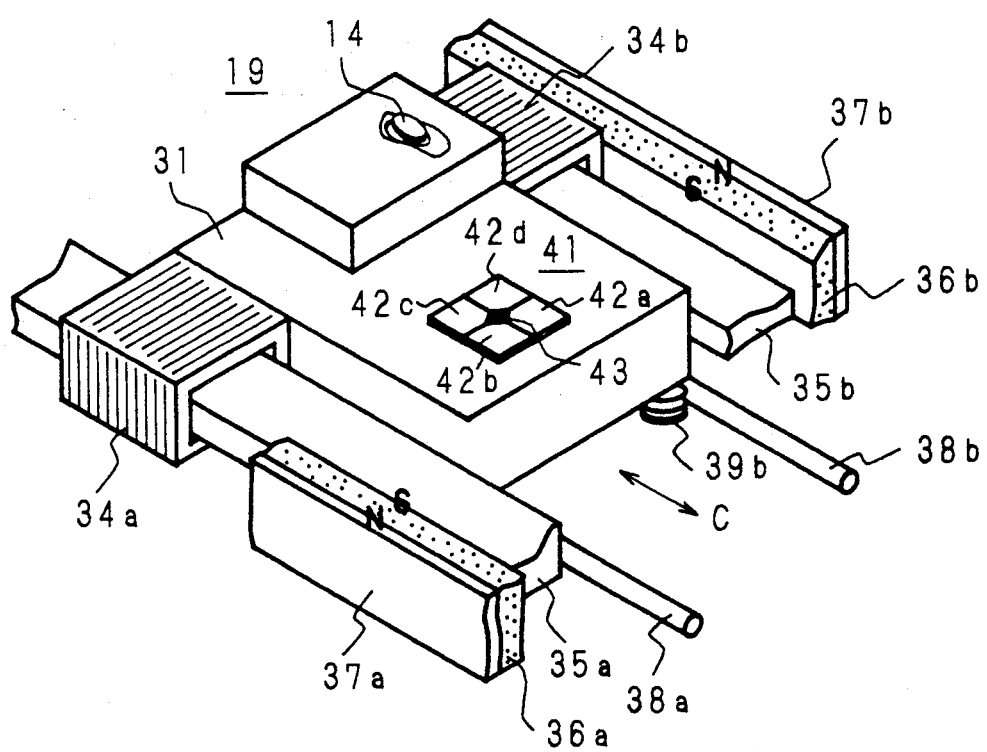
FIG. 5, FIG. 8 and FIG. 9 are perspective views showing the structure of an optical head of this invention.
Figure 6:
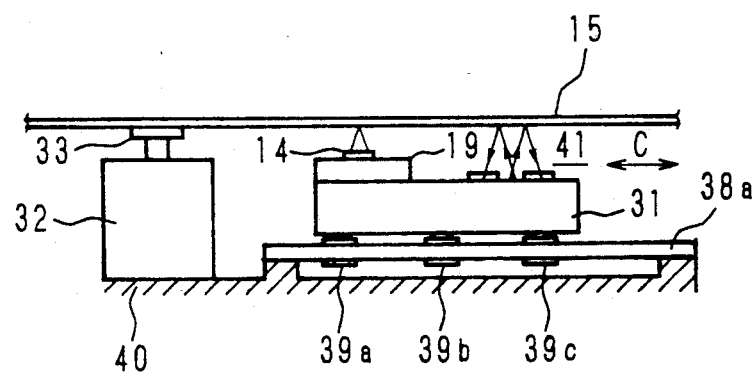
FIG. 6 is a schematic view showing the structure of an optical disk drive loaded with this optical head.
Figure 7:
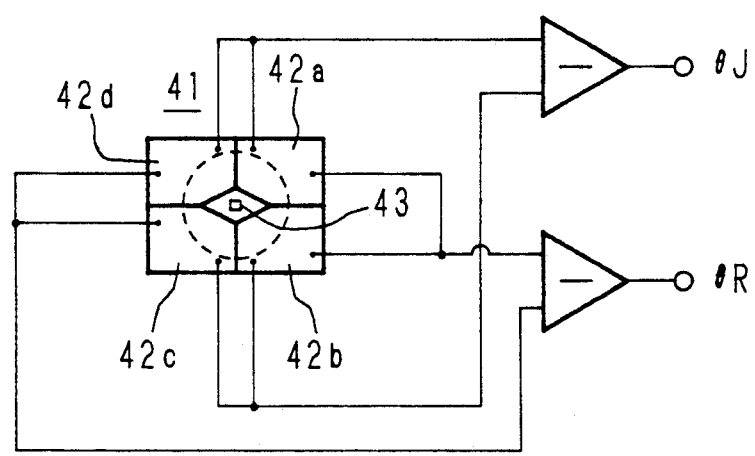
FIG. 7 is a circuit diagram showing the principle of a tilt sensor.
Figure 8:
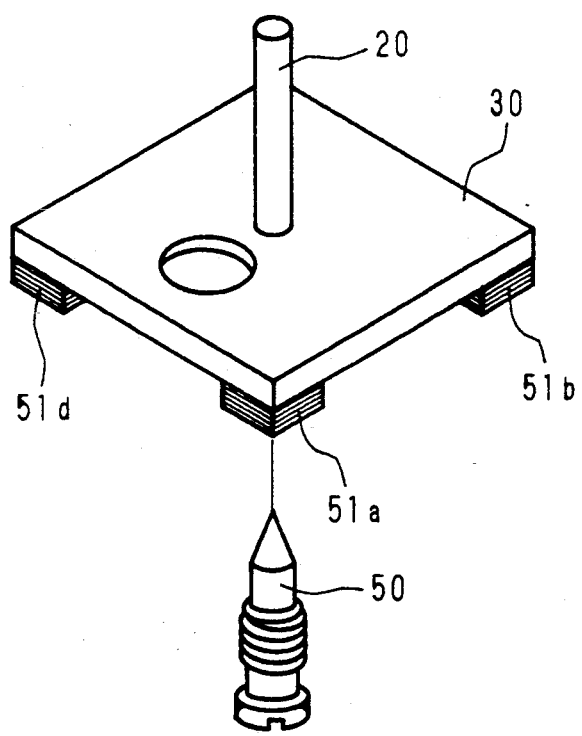
Figure 9:
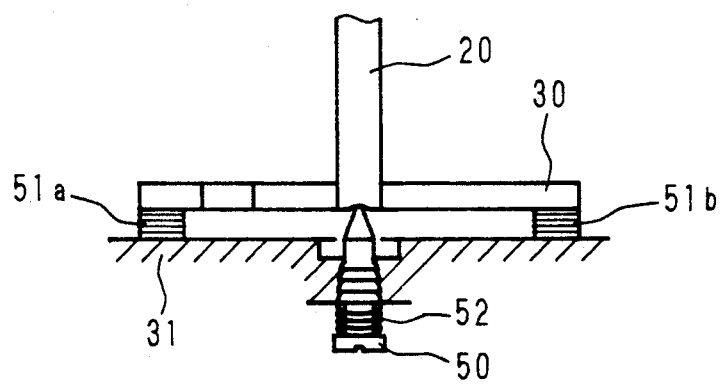

Explanation is given below of this invention on the basis of the drawings showing its embodiments.

FIGS. 5 through 9 are schematic views showing the structure of one embodiment of an optical head of this invention. The parts with the same numerals as in FIGS. 1 through 4 denote the same or corresponding parts. In the figures, a turntable 33 is coupled to a disk motor 32. Linear motor yokes 35a, 35b, linear motor magnets 36a, 36b, linear motor back yokes 37a, 37b, and the like for forming a linear motor are provided at linear motor coils 34a, 34b which drives the optical head in the radial direction (the direction C) of the disk 15. Bearings 39a, 39b and 39c are provided in three places of an optical head base 31, respectively, holding an optical head base 31 movably in the direction indicated by the arrow C along guide shafts 38a, 38b on a fixed base 40. A tilt sensor 41 comprises an LED 43 and elements 42a, 42b, 42c, 42d which receive the light irradiated from LED 43 reflected from the disk 15. A pivot shaft 50 is screwed to the optical head base 31. Four laminating piezoelectric elements 51a, 51b, 51c, 51d are joined to four corners of the actuator base 30, which are also joined to the optical head base 31.

A spring 52 is provided around the pivot shaft 50. The optical head base 31 holding the optical parts and an object lens actuator 19 is driven for access in the direction indicated by the arrow C by supplying power to coils 34a, 34b provided on the side. At this time, the optical axis of the object lens 14 may not be perpendicular to the recording surface of the disk 15 due to the inclination of the guide shafts 38a, 38b, of the surface of the disk 15, or of the turntable 33, sagging and warping of the disk 15. Since this optical axis deviation causes aberration of the light spots on the disk 15, performance in recording/reproducing lowers.

Consequently, in the aforementioned structure, the irradiated light from the LED 43 on the tilt sensor 41 provided on the optical head base 31, and reflected from the disk surface is received by the 4-split photo receiving elements 42a, 42b, 42c, and 42d of the tilt sensor 41 to obtain the tilt amount $\theta R$ in the radial direction and the tilt amount in the direction $\theta J$ orthogonal thereto by computing. According to the tilt amount in each direction thus obtained, the tilt of the optical axis of the object lens 14 is corrected.

To correct the tilt of the optical axis of the object lens 14, the actuator base 30 and the optical head base 31 are joined through a plurality of laminating piezoelectric elements 51a through 51d, and the central part of the actuator base 30 is supported by the pivot shaft 50 screwed to the optical head base 31. The surface of the piezoelectric elements 51a, 51b, 51c and 51d are joined to the actuator base 30, and the bottom surface is joined to the optical head base 31. A shaft 20 is press-fitted to the central part of the actuator base 30, and the lower end of the shaft 20 is threaded, which is screwed from the optical head base 31 side and supported with the pivot shaft 50 preloaded by a spring 52. In such construction, the tilt of the actuator base 30 is corrected by applying voltage to the piezoelectric elements 51a, 51b, 51c and 51d according to the detected amount of the tilt in the radial direction and in the direction orthogonal thereto.

Figure 10:
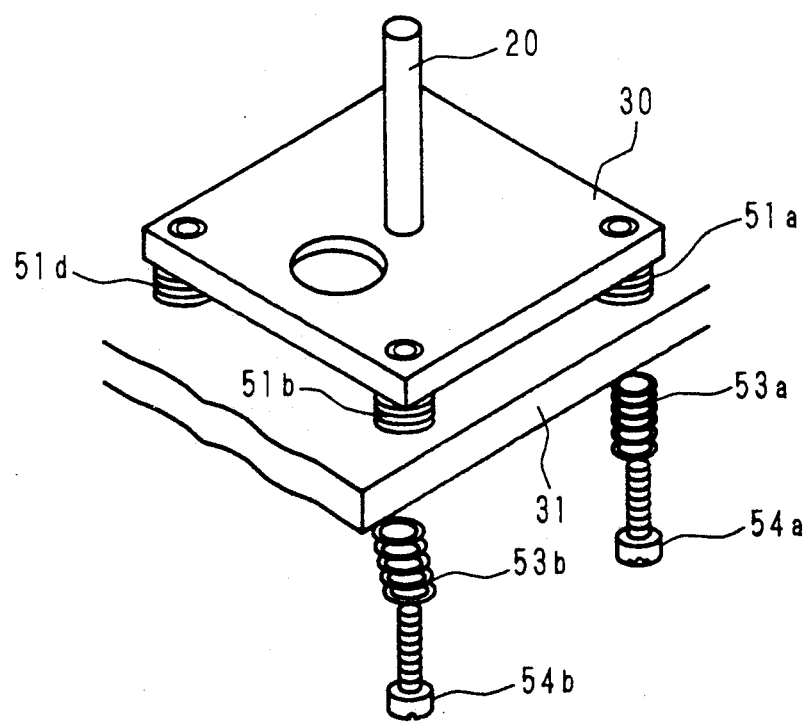
FIG. 10, FIG. 11, FIG. 12 and FIG. 13 are schematic views showing the structure of other embodiments of the optical head of this invention.

In the aforementioned embodiment, the piezoelectric elements 51a, 51b, 51c and 51d are joined, but as shown in FIG. 10, even when the laminating piezoelectric elements 51a through 51d sandwiched between the actuator base 30 and the optical head base 31 are preload by springs 53a through 53d and it is fixed with screws 54a through 54d, the same effect is produced, and further, easier to assemble a unit.

In the above embodiment, the tilt sensor 41 is provided on the optical head base 31, but by providing it on the actuator base 30, a drive circuit for correcting the tilt can be configured more easily.

Figure 11:
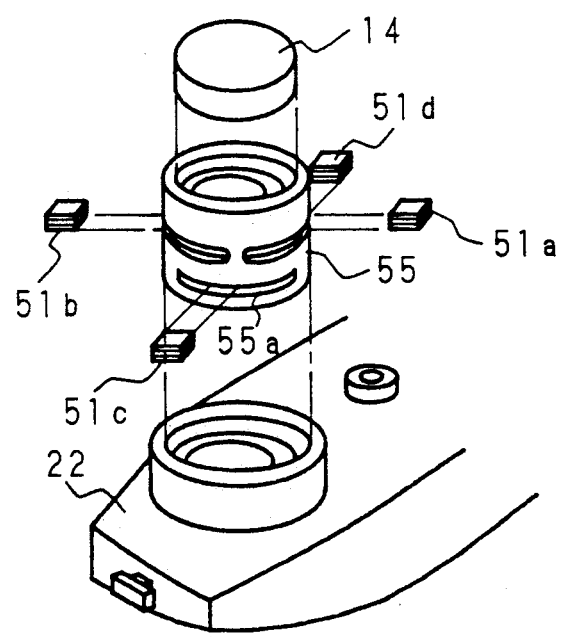

FIG. 11 shows the second embodiment. In this embodiment, to correct the tilt of the object lens 14, a cylindrical lens holder 55 having several grooves 55a provided in two directions orthogonal to each other is used and the laminating piezoelectric elements 51a, 51b, 51c and 51d are joined to the grooves 55a respectively. The others parts are same as those which are shown in FIGS. 4 through 7.

In such structure, the tilts in two orthogonal directions $\theta R$, $\theta J$ are corrected by compressing and expanding the opposing piezoelectric elements according to the tilt amount detected by the tilt sensor 41.

The amount of the tilt to be corrected corresponding to the tilt of the disk 15 is a few mrad, which is approximate 10 $\mu m$ if converted to the displacement of the piezoelectric elements 51a, 51b, 51c and 51d; therefore, even in the aforementioned structure, the displacement amount can be secured sufficiently.

Figure 12:
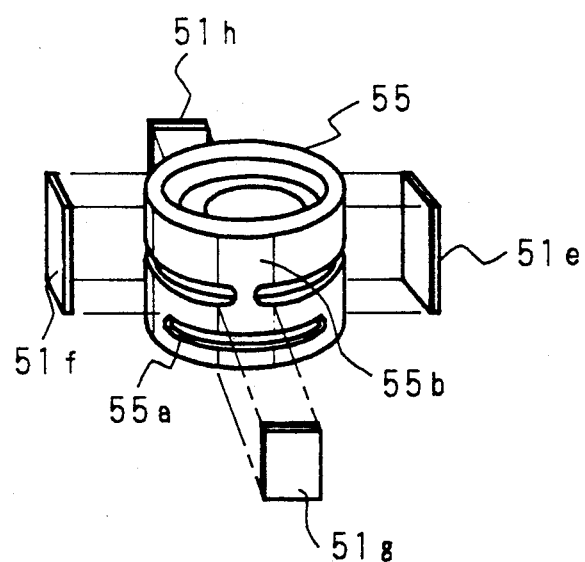

In the above embodiment, a laminating piezoelectric element is used, but as shown in FIG. 12, parts of the circumferential surface of the grooved lens holders 55 are cut to form flat planes 55b, to which bimorph piezoelectric elements 51e, 51f, 51g, 51h are joined, and by bending mutually opposing elements in opposite phase, the tilt can be corrected.

Figure 13:
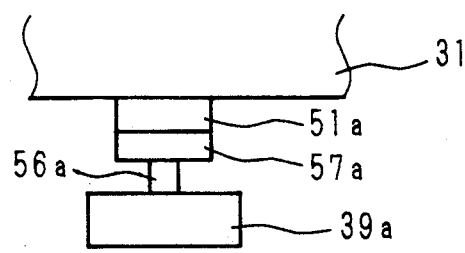
Figure 14:
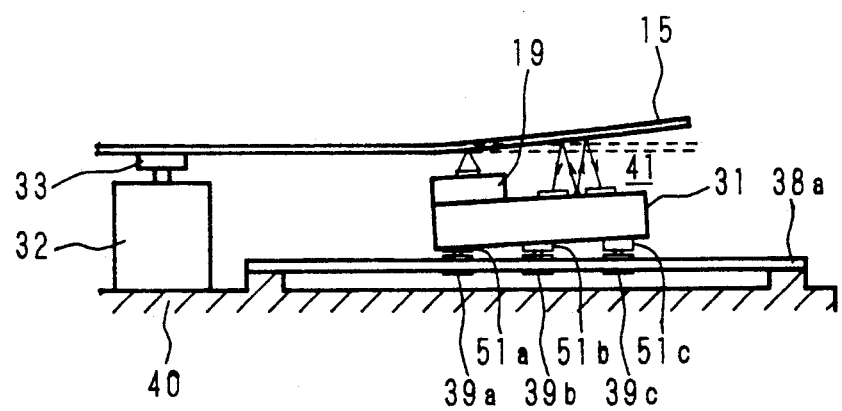
FIG. 14 is a schematic view showing the structure of an optical disk drive loaded with the optical head shown in FIG. 13.

FIGS. 13 and 14 show the third embodiment. Between bearing fixing bases 57a through 57c coupled through support shafts 56a through 56c to bearings 39a through 39c shown in FIG. 6 and the optical head base 31 are arranged laminating piezoelectric elements 51a through 51c coupled to bearing fixing bases 57a through 57c. The other configurations are the same as in FIGS. 5 through 7. From the aforementioned structure, by computing the outputs from the tilt sensor 41, and by applying voltage to the piezoelectric elements 51a through 51c according to the tilt amount detected in two mutually orthogonal directions, the displacement is given to the optical head base 31, thus making it possible to correct the tilt of the light beams 2 to the disk 15.

Figure 15:
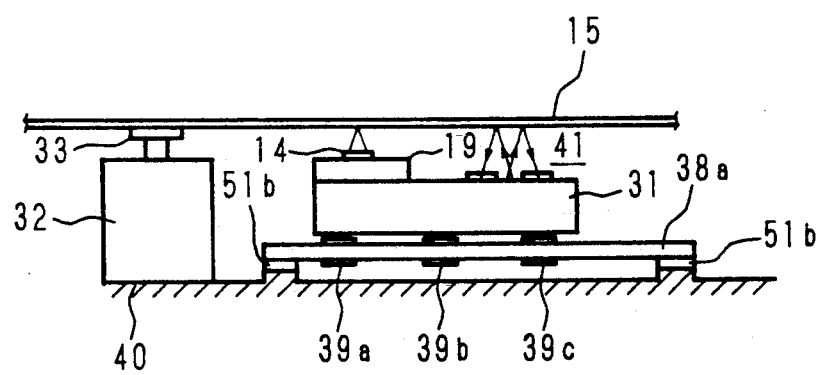
FIG. 15 is a schematic view showing the structure of an optical disk drive loaded with an optical head in other embodiments of this invention.

As shown in FIG. 15, the piezoelectric elements 51a, 51b may be provided at the bottom surface of the guide shaft 38a. The piezoelectric elements are provided at the bottom surface of the guide shaft 38b as well. The same numerals as in FIG. 14 denote the same parts.

In this structure, the same operation and effects can also be expected by applying necessary voltage to the piezoelectric elements 51a, 51b . . . according to the detected amount of the tilt sensor 41.

Figure 16:
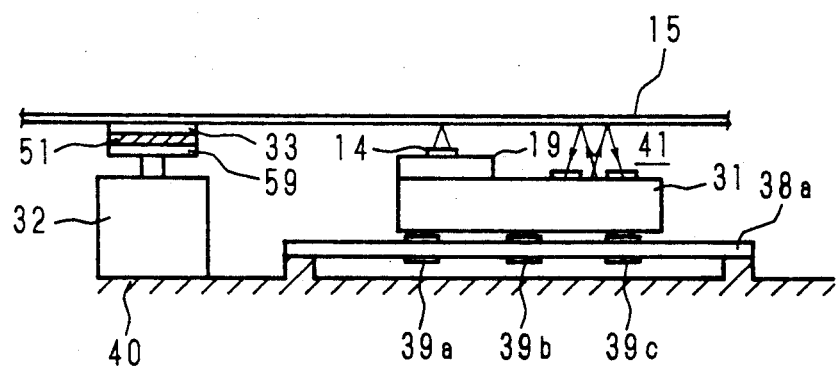
FIG. 16, FIG. 17 and FIG. 18 are schematic views showing the structure of an optical disk drive of this invention.
Figure 17:
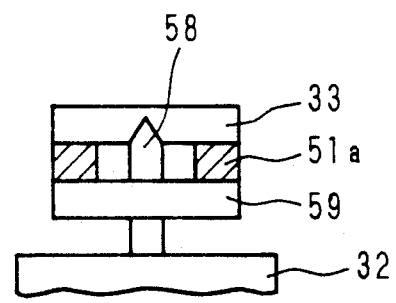
Figure 18:
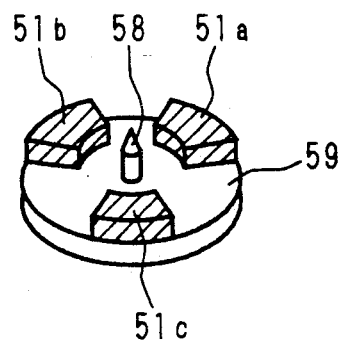

FIGS. 16 through 18 show the fourth embodiment. A pivot hole into which the pivot shaft 58 is inserted is bored in the central part of the turntable 33. The pivot shaft 58 for the pivot supporting turntable 33 is provided in the central part of the piezoelectric element fixing base 59. The top surface of the laminating piezoelectric elements 51a through 51c respectively fixed to the piezoelectric element fixing base 59 are joined to the turntable. Other configurations are the same as in FIGS. 5 through 7.

In this embodiment, the tilt correcting mechanism for the light beam is provided at the disk motor 32 side. As shown in the figure, three piezoelectric elements 51a through 51c are arranged between the turntable 33 and a piezoelectric element fixing base 59. The pivot shaft 58 is press-fitted into the piezoelectric element fixing base 59 so that the turntable 33 is pivot supported, and a pivot hole is provided at the turntable 33. Thus, by applying necessary voltage to the piezoelectric elements 51a through 51c, the tilt of the light beams 2 to the disk 15 is corrected according to the detected amount of the tilt in the radial direction and its orthogonal direction.

Figure 19:
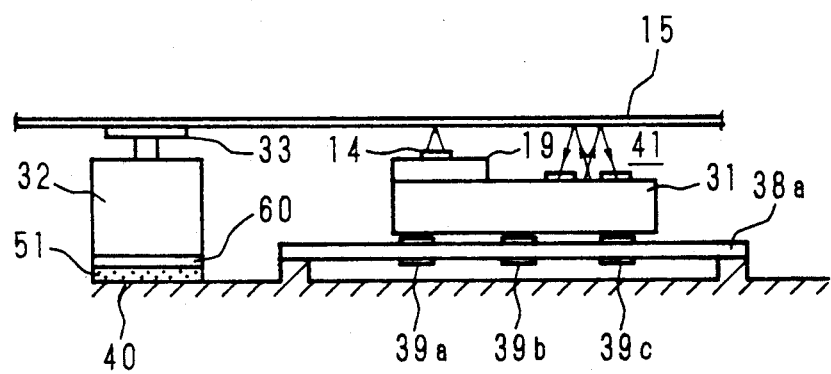
FIG. 19, FIG. 20 and FIG. 21 are schematic views showing the structure of other embodiments of an optical disk drive of this invention.
Figure 20:
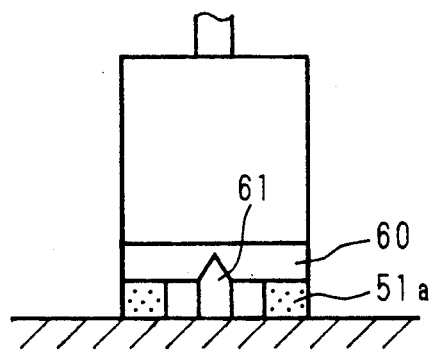
Figure 21:
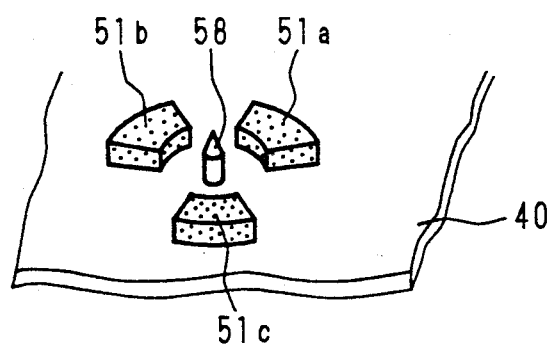

FIGS. 19 through 21 show a modified version of the fourth embodiment. In this figure, a pivot hole into which a pivot shaft 61 is inserted is bored in the central part of a holding base 60 of a disk motor 32. The laminating piezoelectric elements 51a through 51c are provided between the holding base 60 and the fixing base 40. Other configurations are the same as in FIGS. 4 through 7.

In the aforementioned configuration, three piezoelectric elements 51a through 51c are arranged between the disk motor holding base 60 and the fixing base 40, and the pivot shaft 61 is press-fitted into the fixing base 40 so that the disk motor holding base 60 is pivot supported. Thus, the tilt of the light beams to the disk 15 is corrected by applying necessary voltage to the piezoelectric elements 51a through 51c.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An optical head for optically recording/regenerating data to/from a disk, comprising:
    a light source,
    an object lens for converging light beams from said light source onto the disk,
    a lens holder for holding said object lens,
    deviation detecting means for detecting a deviation of light spots condensed on the disk by said object lens on the basis of light reflecting from said disk,
    a lens actuator means for focusing said object lens according to the amount of deviation of light spots detected by said deviation detecting means,
    an actuator supporting base means for supporting said object lens, said lens holder, and said lens actuator means,
    a sensor for detecting an angle between an optical axis as defined by a light beam propagating through the center of the object lens and a surface of the disk,
    an optical system supporting base means for supporting said light source, deviation detecting means and actuator supporting base means,
    a plurality of piezoelectric elements each having a first side and an opposite second side and said piezoelectric elements for correcting an orientation of said object lens and said disk surface in response to detecting by said sensor to orient the optical axis of said object lens to said disk surface,
    said actuator supporting base means and said optical system supporting base means each having respective facing surfaces with outer perimeter edges, and
    means for positioning the first side of said piezoelectric elements on the facing surface of said optical system supporting base means and the second side of said piezoelectric elements on the facing surface of said actuator supporting base means such that the first and second sides of said piezoelectric elements each remain within the outer perimeter edges of both facing surfaces.

2. An optical head for optically recording/regenerating data to/from a disk, comprising:
    a light source,
    an object lens for converging light beams from said light source onto the disk,
    a lens holder for holding said object lens,
    deviation detecting means for detecting a deviation of light spots condensed on the disk by said object lens on the basis of light reflecting from said disk,
    a lens actuator means for focusing said object lens according to the amount of deviation of light spots detected by said deviation detecting means,
    an actuator supporting base means for supporting said object lens, said lens holder, and said lens actuator means,
    a sensor for detecting an angle between an optical axis as defined by a light beam propagating through the center of the object lens and a surface of the disk,
    an optical system supporting base means for supporting said light source, deviation detecting means and actuator supporting base means,
    a shaft means for guiding the movement of said optical system supporting means,
    a plurality of bearings for supporting said optical system supporting means on said shaft means,
    a plurality of piezoelectric elements each having a first side and an opposite second side and said piezoelectric elements for correcting an orientation of said object lens and said disk surface in response to detecting by said sensor to orient the optical axis of said object lens to said disk surface,
    said bearings and said optical system supporting base means each having respective surfaces with outer perimeter edges, and
    means for positioning the first side of said piezoelectric elements on the facing surface of said optical system supporting base means and the second side of said piezoelectric elements on the facing surface of said bearings such that the first and second sides of said piezoelectric elements each remain within the outer perimeter edges of both facing surfaces.

3. An optical head for optically recording/regenerating data to/from a disk, comprising:
a light source,
an object lens for converging light beams from said light source onto the disk,
a lens holder for holding said object lens,
deviation detecting means for detecting a deviation of light spots condensed on the disk by said object lens on the basis of light reflecting from said disk,
a lens actuator means for focusing said object lens according to the amount of deviation of light spots detected by said deviation detecting means,
an actuator supporting base means for supporting said object lens, said lens holder, and said lens actuator means,
a sensor for detecting an angle between an optical axis as defined by a light beam propagating through the center of the object lens and a surface of the disk,
an optical system supporting base means for supporting said light source, deviation detecting means and actuator supporting base means,
a shaft means for guiding the movement of said optical system supporting means,
a fixing base means for supporting said shaft means,
a plurality of piezoelectric elements each having a first side and an opposite second side and said piezoelectric elements for correcting an orientation of said object lens and said disk surface in response to detecting by said sensor to orient the optical axis of said object lens to said disk surface,
said fixing base means and said shaft means each having respective facing surfaces with outer perimeter edges, and
means for positioning the first side of said piezoelectric elements on the facing surface of said shaft means and the second side of said piezoelectric elements on the facing surface of said fixing base means such that the first and second sides of said piezoelectric elements each remain within the outer perimeter edges of both facing surfaces.

4. An optical disk drive for optically recording-/regenerating data to/from a disk, comprising:
a turntable for bearing and rotating the disk,
a disk motor for rotating said turntable,
an optical head including a light source, an object lens for condensing light beams from said light source on the disk, a sensor for detecting an angle between an optical axis as defined by a light beam propagating through the center of the object lens and a surface of the disk, and
a base, at least three nonlinearly disposed piezoelectric elements disposed on said base for correcting a tilt of said disk by adjusting said disk as to orient the optical axis of said object lens to the disk surface according to detected results of said sensor.

5. An optical disk drive as set forth in claim 4 wherein said base means is disposed on a side of the disk motor opposite said turntable.

6. An optical disk drive as set forth in claim 4 wherein said base means is disposed between the disk and the disk motor.

7. An optical disk drive as set forth in claim 4 wherein said piezoelectric elements are disposed in a coplanar circular locus.

8. An optical disk drive for optically recording-/regenerating data to/from a disk, comprising:
a turntable for bearing and rotating the disk,
a disk motor for holding and rotating said turntable,
an optical head including a light source, an object lens for condensing light beams from said light source on the disk, a sensor for detecting an angle between an optical axis as defined by a light beam propagating through the center of the object lens and a surface of the disk, and
several piezoelectric elements for correcting a tilt of said disk by adjusting said disk as to orient the optical axis of said object lens to the disk surface according to detected results of said sensor.

9. An optical head as set forth in claim 8, wherein said piezoelectric elements are located at a bottom surface of said turntable.

10. An optical head as set forth in claim 8, wherein said piezoelectric elements are located at a bottom surface of said disk motor.

11. In an optical disk drive, including an optical head assembly, a method for maintaining an angle between an optical axis as defined by a light beam propagating through the center of an object lens and a surface of a disk, the object lens is secured within an elongated lens holder, comprising the steps:
detecting angles between said optical axis and said disk surface;
generating first and second signals, representative of angular deviations of said optical axis in a radial direction and another direction to said radial direction, respectively;
activating a plurality of piezoelectric elements with said first and second signals, causing said optical axis and said disk surface to be disposed to one another; and
compressing and expanding selected piezoelectric elements, disposed opposite one another so as to displace the disk surface relative to the optical axis of the object lens.

* * * * *